March 15, 1927.

C. E. F. AHLM 1,620,859

TRANSMISSION GEARING

Filed Dec. 31, 1924    2 Sheets-Sheet 1

Inventor
Charles E. F. Ahlm
By Bates, Macklin,
Goldrick & Keare
Attorneys

March 15, 1927.

C. E. F. AHLM 1,620,859

TRANSMISSION GEARING

Filed Dec. 31, 1924    2 Sheets-Sheet 2

Inventor
Charles E. F. Ahlm,
By Bates Machlin
Goldrick & Teare Attorneys

Patented Mar. 15, 1927.

1,620,859

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed December 31, 1924. Serial No. 759,045.

This invention relates to change speed transmission gearing, particularly to automobile transmission gearing for securing a plurality of speed connections between a driven member, such as an engine shaft and a propeller shaft or rear axle.

The gearing is of the general type shown, described and claimed in my copending application filed December 30, 1924, Ser. No. 758,940, in which an eccentrically mounted internal-external gear is employed. to connect gears carried by the driving and driven members. By the use of such a gearing various speeds including zero and reverse may be imparted to the driven member while maintaining a constant engine speed, without the usual shifting of gears and attendant clashing noises. The means for effecting the speed changes include mechanism for holding some of the parts against rotation while permitting others to rotate.

Figure 1:
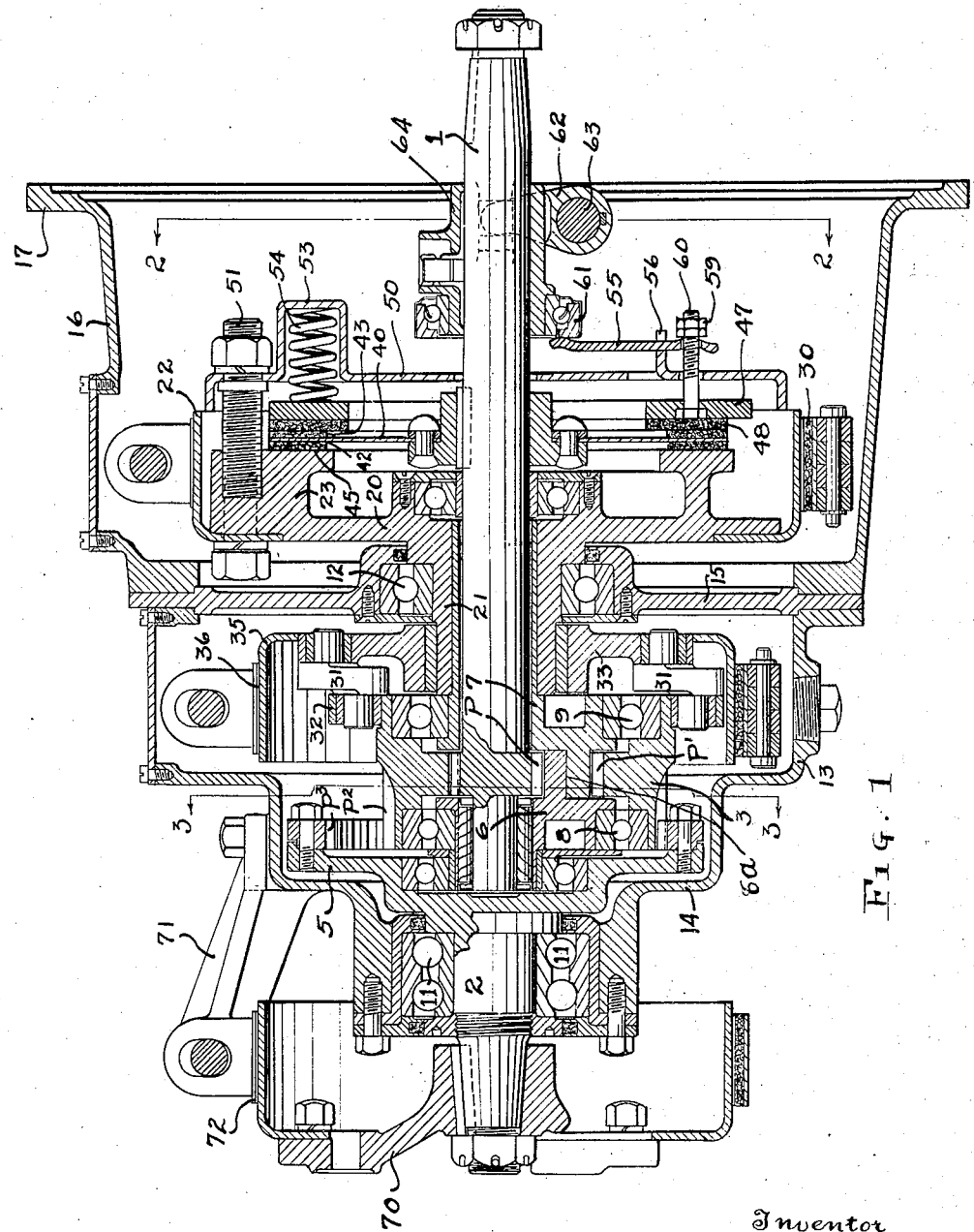
Figure 2:
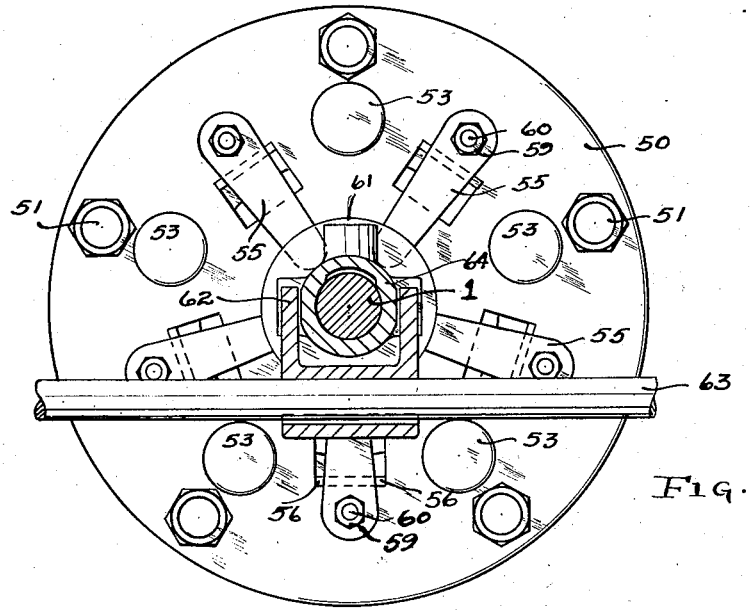
Figure 3:
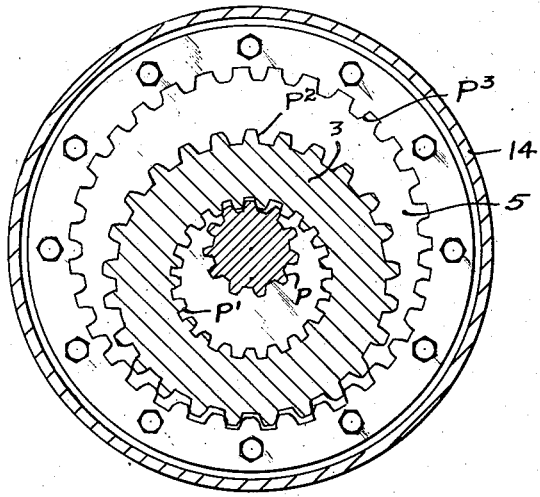

The primary distinguishing characteristic of the present gearing is that a different type of clutching mechanism is employed for picking up the speed of the entire mechanism to that of the engine shaft for directly driving the propeller. I have shown a clutch capable of rigidly connecting the driving or driven member to the bearing for the internal-external gear which will cause an increasing gripping of the relatively moving parts until they are finally rigidly coupled together whereby sudden shock to the mechanism is eliminated. An object of the present invention may be stated to include the provision of a change speed gearing which may be easily and cheaply manufactured from a minimum number of parts and which will be capable of transmitting a great amount of power smoothly and with a minimum wear on the associated parts. Other objects and features will be apparent from the further description relating to the accompanying drawings. The essential characteristics will be summarized in the claims. In the drawing, Fig. 1 is a substantially central longitudinal section through my gearing; Fig. 2 is a fragmentary transverse cross section taken along the line 2—2 of Fig. 1; Fig. 3 is a transverse section taken along the line 3—3 of Fig. 1.

The gearing consists essentially of a driving member indicated at 1 (which may be arranged to be connected to and disconnected from the engine shaft of an automobile) and a driven shaft in alignment therewith and capable of being connected to the usual propeller shaft. For connecting the two shafts together, I employ an external pinion, P, carried by the driving shaft in mesh with internal teeth, $P^1$ of a composite gear member 3. The gear member 3 has also external teeth, $P^2$ and connects with an internal gear, $P^3$, carried on a flange portion 5 rigid with the propeller 2. This internal-external gear is capable of transmitting a reduced speed between the driving and driven members by reason of its being carried on an eccentric bearing, shown as a two-part tubular member indicated at 6 and 7 connected together at $6^a$. The internal-external gear is preferably supported by roller bearings 8 and 9 on the eccentric and positioned at either side of the gears P and $P^1$. All of these members may be suitably supported by bearings, such as 11 and 12 in the casing which is indicated generally at 13 and which I have shown as comprising a rearward portion 14, a bearing supporting web 15, and a forward portion 16. This forward portion may be of any desired shape and flanged as at 17 for attaching the gearing to the bell housing of an engine or to another transmission.

The eccentric member is arranged to be rigidly connected with a braking member 20 shown as having a rearwardly extending tubular portion 21, an exterior braking surface 22 and a counterweighted body portion 23. I choose to employ a brake band 30 secured to the casing for holding the braking member 20, and hence the eccentric, stationary. When the bearing is so held and the driving shaft rotated at a given speed, the internal-external gear is rotated at a reduced speed depending on the difference in size of P and $P^1$ and the gear $P^3$ is rotated at a still further reduced speed depending on the ratio of $P^2$ to $P^3$.

For another speed condition, I have arranged for holding the composite gear against rotation. The means for doing this consists in the type shown. of cranks 31 carried by a flange 32 on the composite gear and the body portion 33 of a braking member 35. This braking member is shown as freely journaled on the tubular extension 21 of the member 20. The offset of the cranks corresponds to that of the axis of the eccentric bearing from the axis of the drive shaft and it results that when the braking member 35 is held stationary as by a cooperating brake member 36, the composite gearing simply circulates about its eccentric bearing. The eccentric bearing is now left free to rotate and in taking up the reaction of the driver P in trying to rotate the composite gear, the bearing is rotated in a reverse direction to that of the driving shaft. The composite gear of course circulates in the same direction as the bearing is rotated and imparts a slower reverse motion to the propeller gear P³.

The third condition is that of direct drive and I have arranged for effecting this by coupling the eccentric bearing to the drive shaft thus preventing any relative rotation between the gears and locking all of the gear members together as a unit.

For accomplishing this, I have shown a disk clutch arrangement employing a disc 40 suitably supported upon a hub member 41 and shown as keyed to the drive shaft. The disc is provided with opposed annular clutching surfaces 42 and 43, the former being adapted to engage a plane annular surface 45 on the member 20, and the latter to engage an annular clutching ring or disc 48 secured to a backing or supporting ring 47. The backing ring may be held against rotation relative to the eccentric by bolts 60 extending through a cup like member 50 which may be in turn held in spaced rigid relation to the braking surface 45 by a series of heavy studs 51 shown as screwed into the member 23. This type of clutch is well adapted to be operated by springs and to this end I provide a series of compression springs 54 seated in closed sockets 53 carried by the cup-like member 50 and bearing against the ring 47. The bolts 60 are shown as utilized in withdrawing the brake ring 48 from engagement with the disk 40. Radially positioned lever arms fulcrumed in brackets 56 carried by the member 50 engage adjustable nuts on the free ends of the bolts 60 while the inwardly projecting ends of the arms press against the outer ring of a bearing member 61. The bearing is shown as carried by a shiftable collar 64 loose on the drive shaft and may be operated as shown by a bifurcated arm 62 rigid with a rock arm 63.

Accordingly when it is desired to shift from one speed to another, as from intermediate to direct or high, the speed of the eccentric may be picked up from zero to the speed of the engine shaft by simply throwing the collar 64 forwardly to allow the springs 54 to operate the clutch. This may be done without danger of damage to any of the associated parts by virtue of the slight initial slippage between the disks before the clutch fully picks up its load. In case it is desired to employ a brake on the propeller shaft in addition to the brakes 22 and 35 I may mount a member 70 having a braking surface 72 on the tapered end of the shaft 2. A cooperating braking member is shown as supported by a bracket 71 rigid with the rearmost section of the casing. The member 70 is adapted to support a flexible disk type of universal joint (not shown).

The speed at which the various members operate in a gearing of similar proportions and with a constant engine speed has been fully explained in connection with the application above referred to. It is apparent that the construction may be varied to obtain an infinite number of speed relations. Moreover I consider it within the scope of my invention to employ various forms of slip friction clutches for the purpose of connecting certain of the parts, such as the eccentric and drive shaft as shown, for effecting direct drive between the driving and driven members. I do not otherwise wish to limit the construction to inessential details.

Having thus described my invention, I claim:

1. In a gearing, a pair of rotatable members, gears rigid with each of the members, a rotatable eccentric bearing journaled about one of the rotatable members, a composite gear member having mutually rigid separate gears each of which mesh with a respective first mentioned gear, the composite gear surrounding the bearing and being supported thereby, a member rigid with the bearing and having a plurality of friction surfaces, a member rigid with one of the first mentioned members and having cooperating friction surfaces one adjacent each of the first mentioned surfaces and means to cause such adjacent surfaces to engage to control the relative rotation of the bearing and last mentioned rotatable member.

2. In a gearing, a pair of rotatable members to be connected in different speed relations, an independently rotatable bearing member having an eccentric bearing portion, gears rigid with each of said rotatable members, and a composite gear supported by the eccentric portion and surrounding portions of the bearing member, and a portion of one of the rotatable members, said composite gear having sets of teeth one in mesh with each of the first mentioned gears, means for restraining the rotation of the composite gear for a given speed and a disc clutch for controlling the independent rotation of the bearing member for another speed.

3. In a gearing, a pair of rotatable members to be connected in different speed relations, an independently rotatable bearing member having an eccentric portion, gears rigid with each of the rotatable members, and a composite gear supported by the eccentric portion and embracing the bearing and one of the rotatable members, the composite gear having a plurality of mutually rigid gears, one in mesh with each of the said first mentioned gears, means for restraining the rotation of the composite gear for a given speed, a clutch for controlling the independent rotation of the bearing member for another speed, said clutch comprising a friction disc rigid with one of said rotatable members, a circular plate rigid with the bearing and means for causing the disc to engage the plate.

4. In a gearing, a pair of rotatable members to be connected, a rotatable bearing member surrounding one of said members and having an eccentric portion, gears rigid with each of said rotatable members, and a hollow member mounted for rotation on the eccentric having gears rigid therewith in mesh with said first mentioned gears, means rigid with the bearing member for restraining the rotation thereof for effecting a given speed relation between the rotatable members, and a disc clutch member rigid with one of the rotatable members for coupling the same to the bearing member for another speed.

5. In a gearing, a pair of rotatable members to be connected in different speed relations, gears rigid with each of the members, an eccentric bearing member surrounding one of said members and capable of free rotation, a hollow composite gear member surrounding and supported by the bearing member and having separate sets of gear teeth each meshing with one of the first mentioned gears, means for restraining the rotation of the composite gear when the bearing rotates for effecting a given speed relation between the rotatable members, means for restraining the rotation of the bearing for another speed, a friction plate rigid with the bearing, a friction disc rigid with one of the rotatable members adjacent such plate, a friction ring rigid with the bearing adjacent the disc on the side opposite the plate, and means for causing all of the friction members to cooperate to couple the bearing and said last mentioned rotatable member together for a third speed.

6. In a gearing, in combination, a driving member having a pinion, a composite gear member in mesh with said pinion, an eccentric bearing for said gear member capable of independent rotation relative to the driving member and of being held relatively stationary, a driven member having a geared connection with said composite gear, means for preventing the rotation of said composite gear while permitting it to revolve upon the eccentric bearing when the bearing is free to rotate for transmitting one speed to the driven member, and means including a plurality of disks adapted to be compressed together to couple the eccentric to said driving member for synchronously rotating the driving and driven members.

7. In a gearing, in combination, a driving member having a pinion, an internal-external gear member in mesh with said pinion, an eccentric bearing member for said gear arranged to rotate or to be held relatively stationary, a driven member having a geared connection with said composite gear, means for retarding the rotating movement of the composite gear while permitting the revolving movement thereof for transmitting a low speed to said driven member, means for holding the bearing against rotation while permitting the internal-external gear to rotate for transmitting another speed, and means including a plurality of friction discs for preventing relative rotation between the gears, the bearing and the driving and driven members.

8. In a transmission gearing in combination, a driving member, a rotatable and revoluble gear member in off-set relation thereto and having a geared connection therewith, a bearing member therefor, a driven member having a geared connection with said gear member, means for retarding the rotation movement of the gear member but permitting it to revolve for imparting a low speed to the driven member, and means including a member having a clutch surface rigid with said bearing, a disc having opposed clutching surfaces rigid with said driving member and a clutch operating member adapted to frictionally engage said disk and compress it against said first named clutch surface for temporarily locking the driving and driven members against relative rotation for direct drive.

In testimony whereof, I hereunto affix my signature.

CHARLES E. F. AHLM.